United States Patent
Muto et al.

(10) Patent No.: US 7,273,825 B2
(45) Date of Patent: Sep. 25, 2007

(54) DIELECTRIC CERAMIC AND MONOLITHIC CERAMIC CAPACITOR

(75) Inventors: Kazuo Muto, Kusatsu (JP); Tomoyuki Nakamura, Moriyama (JP); Akira Kato, Moriyama (JP); Harunobu Sano, Kyoto (JP); Takehisa Sasabayashi, Ritto (JP); Takashi Hiramatsu, Kusatsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/657,449

(22) Filed: Jan. 25, 2007

(65) Prior Publication Data

US 2007/0142210 A1    Jun. 21, 2007

Related U.S. Application Data

(63) Continuation of application No. PCT/JP2005/011259, filed on Jun. 20, 2005.

(30) Foreign Application Priority Data

Aug. 19, 2004   (JP) .............................. 2004-239310

(51) Int. Cl.
    *C04B 35/468*    (2006.01)
(52) U.S. Cl. ..................... 501/138; 501/139; 361/321.4
(58) Field of Classification Search ................ 501/138, 501/139
    See application file for complete search history.

(56) References Cited

U.S. PATENT DOCUMENTS 5,403,797 A  *  4/1995  Ohtani et al. ............... 501/138
6,058,005 A  *  5/2000  Matoba et al. ........... 361/321.4
7,160,827 B2 *  1/2007  Banno ......................... 501/138

FOREIGN PATENT DOCUMENTS

| | | |
|---|---|---|
| JP | 08-124785 | 5/1996 |
| JP | 2000-58378 | 2/2000 |
| JP | 2000-154055 | 6/2000 |
| JP | 2000-185969 | 7/2000 |
| JP | 2001-39765 | 2/2001 |
| JP | 2002-29836 | 1/2002 |
| JP | 2003-165768 | 6/2003 |
| JP | 2004-217520 | 8/2004 |

OTHER PUBLICATIONS

Written Opinion of the International Searching Authority dated Aug. 19, 2004.

* cited by examiner

*Primary Examiner*—Karl Group
(74) *Attorney, Agent, or Firm*—Dickstein, Shapiro, LLP.

(57) ABSTRACT

The dielectric ceramic has a composition represented by general formula $100(Ba_{1-x-y}Sr_xCa_y)_m(Ti_{1-z}Zr_z)O_3+aBaO+bR_2O_3+cMgO+dMnO+eCuO+fV_2O_5+gX_uO_v$ (where R is a rare-earth element such as La, Ce or Pr; and $X_uO_v$ is an oxide group including at least Si); and $0 \leq x \leq 0.05$, $0 \leq y \leq 0.08$ (preferably $0.02 \leq y \leq 0.08$), $0 \leq z \leq 0.05$, $0.990 \leq m$, $100.2 \leq (100 \, m+a) \leq 102$, $0.05 \leq b \leq 0.5$, $0.05 \leq c \leq 2$, $0.05 \leq d \leq 1.3$, $0.1 \leq e \leq 1.0$, $0.02 \leq f \leq 0.15$, and $0.2 \leq g \leq 2$. With this composition, a monolithic ceramic capacitor retaining good dielectric characteristics and temperature characteristics even if a high field strength voltage is applied by further thinning the dielectric layers thereof and having excellent reliability achieving good isolating property, dielectric strength, and high-temperature load life is obtained.

20 Claims, 1 Drawing Sheet

US 7,273,825 B2

DIELECTRIC CERAMIC AND MONOLITHIC CERAMIC CAPACITOR

This is a continuation of application Serial No. PCT/JP2005/011259, filed Jun. 20, 2005.

TECHNICAL FIELD

The present invention relates to dielectric ceramics and monolithic ceramic capacitors. More specifically, the present invention relates to dielectric ceramics suitable for use as dielectric materials in small-size and high-capacity monolithic ceramic capacitors and relates to monolithic ceramic capacitors fabricated using these dielectric ceramics.

BACKGROUND ART

With recent developments in electronics technology, monolithic ceramic capacitors have rapidly decreased in size and increased in capacity.

A monolithic ceramic capacitor is fabricated by alternately stacking dielectric layers and internal electrodes to form a laminate and sintering the resulting laminate. In order to decrease the size and increase the capacity of a monolithic ceramic capacitor, it is necessary to reduce the thickness of each dielectric layer.

However, when dielectric layers are thinned, voltage of a high field strength is applied to the dielectric layers. Therefore, a decrease in the relative dielectric constant $\epsilon r$, a deterioration in the temperature characteristic, and a decrease in reliability may be induced.

Consequently, the dielectric ceramic has been required to be able to retain a high dielectric constant even if a high field strength voltage is applied to the dielectric layers due to a decrease in the thickness thereof, and to have excellent reliability achieving a good isolating property, dielectric strength and endurance.

According to such requirements, a dielectric ceramic containing 0.2 to 5.0 parts by weight of a certain sintering additive per 100 parts by weight of a main component represented by general formula $\{Ba_{1-x}Ca_xO\}_mTiO_2 + \alpha Re_2O_3 + \beta MgO + \gamma MnO$ (where Re represents a specific rare-earth element) has been disclosed (Patent Document 1).

In Patent Document 1, a monolithic ceramic capacitor having a good temperature characteristic and excellent reliability is achieved by adding a rare-earth oxide, MgO, and MnO to a main component represented by $\{Ba_{1-x}Ca_xO\}_mTiO_2$ and limiting the molar ratio x between Ca and Ba, the molar ratio m of (Ba,Ca) to Ti, and the molar ratios $\alpha$, $\beta$, and $\gamma$ of the respective additive components to the main component to predetermined ranges.

Furthermore, in another conventional technology, a dielectric ceramic having a component represented by general formula $\{Ba_{1-x}Ca_x\}_mTiO_3 + \alpha_1BaO + \alpha_2CaO + \beta V_2O_5$ and containing 0.2 to 5.0 parts by weight of a certain sintering additive per 100 parts by weight of a main component represented by $(Ba_{1-x}Ca_x)_mTiO_3$ has been disclosed (Patent Document 2).

In Patent Document 2, a monolithic ceramic capacitor having a good temperature characteristic, a high isolating property, and excellent reliability is achieved by adding BaO, CaO, and $V_2O_5$ to the main component represented by $\{Ba_{1-x}Ca_x\}_mTiO_3$ and limiting the molar ratio x between Ca and Ba, the molar ratio m of (Ba,Ca) to Ti, and molar ratios $\alpha_1$, $\alpha_2$, and $\beta$ of the respective additive components to the main component to predetermined ranges.

Patent Document 1: Japanese Unexamined Patent Application Publication No. 2000-58378
Patent Document 2: Japanese Unexamined Patent Application Publication No. 2003-165768

DISCLOSURE OF INVENTION

Problems to be Solved by the Invention

However, when the thickness of each dielectric layer in the monolithic ceramic capacitors disclosed in Patent Documents 1 and 2 is decreased to about 1 µm, the isolating property and the field strength under a high electric field are decreased and high-temperature load life is also decreased. Hence, a decrease in the reliability is problematically induced. Additionally, when the average grain size of ceramic grains is reduced for improving the reliability, the relative dielectric constant $\epsilon r$ is problematically decreased.

The present invention has been accomplished in view of the above-mentioned problems. It is an object of the present invention to provide a dielectric ceramic for fabricating a monolithic ceramic capacitor which can retain a good dielectric characteristic and temperature characteristic even if a voltage high field strength voltage is applied by further thinning the dielectric layers and have excellent reliability achieving a good isolating property, dielectric strength, and high-temperature load life. It is another object of the present invention to provide a monolithic ceramic capacitor fabricated from such a dielectric ceramic.

Means for Solving the Problem

The present inventors have found the fact that a dielectric ceramic which can be used for fabricating an highly reliable monolithic ceramic capacitor having good isolating property, dielectric strength, and high-temperature load life and retaining good dielectric characteristics and temperature characteristics even if the dielectric layers are thinned or the main component contains Sr or Zr by adding predetermined amounts of a Cu component and a V component as well as a sintering additive containing a Mg component, a Mn component, a rare-earth oxide and a Si component to a dielectric ceramic material including a main component represented by $(Ba,Ca)TiO_3$.

The present invention has been accomplished on the basis of this finding. A dielectric ceramic according to the present invention includes a composition represented by general formula $100\ (Ba_{1-x-y}Sr_xCa_y)_m(Ti_{1-z}Zr_z)O_3 + aBaO + bR_2O_3 + cMgO + dMnO + eCuO + fV_2O_5 + gX_uO_v$ (where R represents at least one element selected from the group consisting of La, Ce, Pr, Nd, Sm, Eu, Gd, Tb, Dy, Ho, Er, Tm, Yb, Lu and Y; and $X_uO_v$ represents an oxide containing at least Si), and $0 \leq x \leq 0.05$, $0 \leq y \leq 0.08$, $0 \leq z \leq 0.05$, $0.990 \leq m$, $100.2 \leq (100\ m+a) \leq 102$, $0.05 \leq b \leq 0.5$, $0.05 \leq c \leq 2$, $0.05 \leq d \leq 1.3$, $0.1 \leq e \leq 1.0$, $0.02 \leq f \leq 0.15$, and $0.2 \leq g \leq 2$.

From the viewpoint of improving the high-temperature load life, the above-mentioned y is preferably $0.02 \leq y \leq 0.08$.

That is to say, in the dielectric ceramic according to the present invention, y is preferably $0.02 \leq y \leq 0.08$.

In addition, the present inventors have investigated the relationship of the dielectric ceramic having a composition represented by the above-described general formula and the average grain size thereof and have found that the reliability can be further improved by adjusting the average grain size to 0.21 to 0.45 μm by controlling manufacturing conditions of the dielectric ceramic.

That is to say, in the dielectric ceramic according to the present invention, the average grain size is preferably 0.21 to 0.45 μm.

Further, the above-mentioned $X_uO_v$ functions as a sintering additive to accelerate low-temperature sintering. The sintering can be achieved at a lower temperature by using an optional combination of an oxide of silicon ($SiO_2$) and various types of glass materials, as sintering additives.

That is to say, in the dielectric ceramic according to the present invention, the component X of the $X_uO_v$ contains Si and may contain at least one element selected from the group consisting of Li, B, Na, K, Be, Mg, Ca, Sr, Ba, Al, Ga, Ti and Zr.

Further, the present inventors have conducted intensive studies and have found the fact that desired reliability can be achieved without affecting various characteristics even if impurities such as Zr, Ni, Fe and Co are unavoidably contained in the dielectric ceramic.

That is to say, the dielectric ceramic according to the present invention may contain at least one element selected from the group consisting of Zr, Ni, Fe, Co, Al, Ag, Mo, Ta, Pd, Zn, Hf, Nb and W.

In addition, a monolithic ceramic capacitor according to the present invention includes a ceramic sintered compact, a plurality of internal electrodes, and external electrodes. The ceramic sintered compact is formed from a ceramic laminated body of a stacked plurality of dielectric layers that are formed of the above-described dielectric ceramic. The internal electrodes are buried in the ceramic sintered compact in parallel to each other. The external electrodes are disposed on the outer surface of the ceramic sintered compact.

Further, in the monolithic ceramic capacitor according to the present invention, the internal electrodes preferably contain a base metal material and the external electrodes preferably contain a base metal material.

ADVANTAGEOUS EFFECT OF THE INVENTION

The dielectric ceramic according to the present invention has a composition represented by general formula 100 $(Ba_{1-x-y}Sr_xCa_y)_m(Ti_{1-z}Zr_z)O_3$+aBaO+b$R_2O_3$+cMgO+dMnO+eCuO+f$V_2O_5$+g$X_uO_v$ (where R represents at least one element selected from the group consisting of La, Ce, Pr, Nd, Sm, Eu, Gd, Tb, Dy, Ho, Er, Tm, Yb, Lu and Y; and $X_uO_v$ represents an oxide containing at least Si), and $0 \leq x \leq 0.05$, $0 \leq y \leq 0.08$, $0 \leq z \leq 0.05$, $0.990 \leq m$, $100.2 \leq (100 m+a) \leq 102$, $0.05 \leq b \leq 0.5$, $0.05 \leq c \leq 2$, $0.05 \leq d \leq 1.3$, $0.1 \leq e \leq 1.0$, $0.02 \leq f \leq 0.15$, and $0.2 \leq g \leq 2$. With this composition, a dielectric ceramic, which can be used for fabricating an highly reliable monolithic ceramic capacitor achieving a good isolating property, dielectric strength, and high-temperature load life and retaining a dielectric characteristic and a temperature characteristic of capacitance even if the dielectric layers are further thinned or Sr or Zr is contained in the main component, can be provided.

In addition, the high-temperature load life can be further improved when y is $0.02 \leq y \leq 0.08$.

Further, the sintering can be performed at lower temperature by using a sintering additive containing $SiO_2$ and a metal oxide containing Li, B or Na. Hence, a dielectric ceramic which can be used for fabricating an highly reliable monolithic ceramic capacitor can be readily provided.

Furthermore, the above-described characteristics are not affected even if impurities such as Zr, Ni and Fe are contained in the dielectric ceramic. Hence, a dielectric ceramic which can be used for fabricating an highly reliable monolithic ceramic capacitor can be readily provided.

In addition, the monolithic ceramic capacitor according to the present invention includes a ceramic sintered compact formed from a ceramic laminated body of a stacked plurality of dielectric layers, a plurality of internal electrodes buried in the ceramic sintered compact in parallel to each other, and external electrodes disposed on the outer surface of the ceramic sintered compact. Since the ceramic sintered compact is formed of the above-described dielectric ceramic, the resulting monolithic ceramic capacitor has a good dielectric characteristic and a good temperature characteristic of capacitance and shows excellent reliability achieving good isolating properties and high-temperature load life.

Further, in the monolithic ceramic capacitor according to the present invention, the internal electrodes contain a base metal material and the external electrodes contain a base metal material. Therefore, the monolithic ceramic capacitor which is good in the above-described various characteristics and excellent in the reliability can be fabricated at a low cost.

REFERENCE NUMERALS

Figure 1:
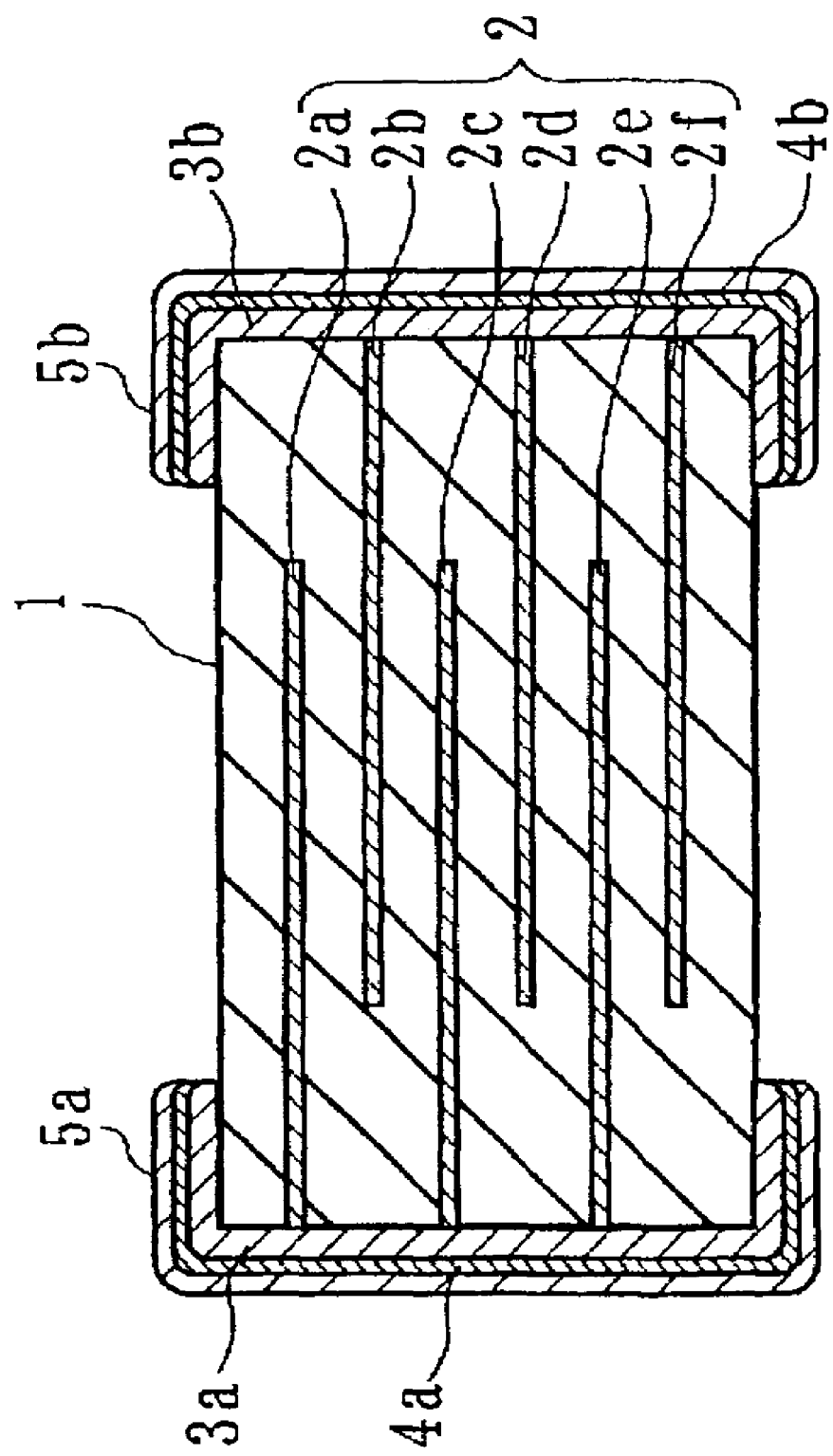
FIG. 1 is a cross-sectional view of a monolithic ceramic capacitor according to an embodiment which is fabricated using a dielectric ceramic according to the present invention.

1 ceramic sintered compact (dielectric ceramic)
2 (2a to 2f) internal electrode
3a, 3b external electrode Best Mode for Carrying Out the Invention Next, the embodiments according to the present invention will be described in detail.

A dielectric ceramic according to the present invention has a composition represented by the following general formula (A):

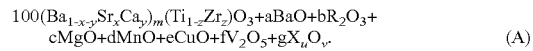

$$100(Ba_{1-x-y}Sr_xCa_y)_m(Ti_{1-z}Zr_z)O_3+aBaO+bR_2O_3+cMgO+dMnO+eCuO+fV_2O_5+gX_uO_v. \quad (A)$$

In this general formula, R represents at least one rare-earth element selected from the group consisting of La, Ce, Pr, Nd, Sm, Eu, Gd, Tb, Dy, Ho, Er, Tm, Yb, Lu and Y; and $X_uO_v$ represents an oxide containing at least Si.

In other words, the dielectric ceramic according to the present invention includes a complex oxide having a perovskite crystal structure (general formula $ABO_3$) composed of $(Ba_{1-x-y}Sr_xCa_y)_m(Ti_{1-z}Zr_z)O_3$ as a main component and includes BaO, $R_2O_3$, MgO, MnO, CuO, $V_2O_5$ and $X_uO_v$ as additive components at predetermined molar amounts per 100 moles of the main component.

The molar ratios x, y, z and m of the respective elements in the main component and the molar amounts a, b, c, d, e, f and g of the respective additive components per 100 moles of the main component are adjusted to satisfy the following expressions (1) to (11):

(1) $0 \leq x \leq 0.05$;
(2) $0 \leq y \leq 0.08$;
(3) $0 \leq z \leq 0.05$;
(4) $0.990 \leq m$;
(5) $100.2 \leq (100 m+a) \leq 102$;

(6) $0.05 \leq b \leq 0.5$;
(7) $0.05 \leq c \leq 2.0$;
(8) $0.05 \leq d \leq 1.3$;
(9) $0.1 \leq e \leq 1.0$;
(10) $0.02 \leq f \leq 0.15$; and
(11) $0.2 \leq g \leq 2$.

In the dielectric ceramic of the present invention, general formula (A) satisfies expressions (1) to (11) and thereby, a monolithic ceramic capacitor fabricated using such a dielectric ceramic can retain good dielectric characteristics and temperature characteristics even if the dielectric layers are further thinned and a high field strength voltage is applied to the dielectric layers and has excellent reliability achieving good isolating properties, dielectric strength, and high-temperature load life. Particularly, the dielectric constant can be increased and the high-temperature load life under a high electric field can be improved by substituting a part of the Ba component in $BaTiO_3$ with a Ca component and adding both a Cu component and a V component to the dielectric ceramic.

The grounds for limiting the molar ratios x, y, z and m of the respective elements in the main component and the molar amounts a, b, c, d, e, f and g of the respective additive components to the above-described ranges will be described in detail below.

(1) Molar Ratio x

In the dielectric ceramic according to this embodiment, a good isolating property and dielectric strength can be achieved without impairing the dielectric characteristic and temperature characteristic even if a small amount of Sr is unavoidably solid-dissolved in the A site of $(Ba,Ca)TiO_3$ as an impurity during the manufacturing process. Thus, the desired reliability can be secured. When the molar ratio x of Sr in the A site is higher than 0.05, the high-temperature load life is decreased, which may induce a decrease in the reliability.

Therefore, in this embodiment, the molar ratio x is adjusted to $0 \leq x \leq 0.05$ by controlling manufacturing conditions.

(2) Molar Ratio y

The reliability of the dielectric ceramic can be improved by substituting a part of Ba in $BaTiO_3$ with Ca, if necessary. However, when the molar ratio y of Ca is higher than 0.08, the relative dielectric constant $\epsilon r$ may be decreased.

Therefore, in this embodiment, the molar ratio y is adjusted to $0 \leq y \leq 0.08$ by controlling the amount of the Ca component.

In particular, the high-temperature load life can be further improved by solid-dissolving Ca in the A site. Therefore, from such a viewpoint, the molar ratio y of Ca is preferably 0.02 or more, namely, a preferable range of the molar ratio y is $0.02 \leq y \leq 0.08$.

(3) Molar Ratio z

In the dielectric ceramic according to this embodiment, a good isolating property and dielectric strength can be achieved without impairing the dielectric characteristic and temperature characteristic even if Zr is solid-dissolved in the B site of $(Ba,Ca)TiO_3$ during the manufacturing process. Thus, the desired reliability can be secured. When the molar ratio z of Zr in the B site is higher than 0.05, the high-temperature load life may be decreased.

Therefore, in this embodiment, the molar ratio z is adjusted to $0 \leq z \leq 0.05$ by controlling manufacturing conditions.

(4) Molar Ratio m

When the molar ratio m of $(Ba_{1-x-y}Sr_xCa_y)$ as the A site component to $(Ti_{1-z}Zr_z)$ as the B site component is less than 0.990, the dielectric strength and the high-temperature load life are significantly decreased.

Therefore, the molar ratio m is adjusted to $0.990 \leq m$ in this embodiment, by controlling blending quantities of the A site component and the B site component.

(5) Molar Amount a

A dielectric ceramic having good characteristics can be obtained by controlling the molar amounts of the A site component and the B site component by adding BaO to the main component $(Ba_{1-x-y}Sr_xCa_y)_m(Ti_{1-z}Zr_z)$. However, when the total molar amount (100 m+a) of the Ba component in a dielectric ceramic is lower than 100.2, the temperature characteristic of capacitance is deteriorated and temperature stability is unsatisfactory. The temperature characteristic of capacitance is required to be in accordance with the X7R characteristic specified by the EIA (American Electronic Industry Association). Here, the term the X7R characteristic means a characteristic in which a capacitance change $\Delta C/C_{25}$ is within $\pm 15\%$ in the temperature range of $-55°$ C. to $+125°$ C. when the capacitance at $+25°$ C. is used as a benchmark.

When the total molar amount (100 m+a) of the Ba component in a dielectric ceramic is lower than 100.2, the capacitance change is increased and therefore the X7R characteristic is not satisfied. Thus, the temperature stability becomes unsatisfactory.

Furthermore, in such a dielectric ceramic, the high-temperature load life is decreased, which may induce a decrease in the reliability.

On the other hand, when the total molar amount (100 m+a) of the Ba component in a dielectric ceramic is higher than 102, the relative dielectric constant $\epsilon r$ may be decreased.

Therefore, BaO is added to the main component in this embodiment, so that the total molar amount (100 m+a) of the Ba component in a dielectric ceramic is adjusted to $100.2 \leq (100 m+a) \leq 102$.

(6) Molar Amount b

The reliability such as isolating property and high-temperature load life can be improved by adding a certain rare-earth oxide $R_2O_3$ to a dielectric ceramic. However, when the molar amount b of the rare-earth oxide $R_2O_3$ is lower than 0.05 moles per 100 moles of the main component, the high-temperature load life is decreased, which may induce a decrease in the reliability.

On the other hand, when the molar amount b is higher than 0.5 moles, the temperature characteristic is deteriorated not to satisfy the X7R characteristic.

Therefore, in this embodiment, a certain rare-earth oxide $R_2O_3$ is added to the dielectric ceramic so that the molar amount b is $0.05 \leq b \leq 0.5$ per 100 moles of the main component.

(7) Molar Amount c

In this embodiment, a Mg component is added to the main component in a form of MgO. When the molar amount c of MgO is lower than 0.05 moles per 100 moles of the main component, the temperature characteristic is deteriorated not to satisfy the X7R characteristic. Further, the high-temperature load life is decreased, which may induce a decrease in the reliability.

On the other hand, when the molar amount c of MgO is higher than 2.0 moles per 100 moles of the main component, a decrease in the relative dielectric constant $\epsilon r$ is disadvantageously induced.

Therefore, in this embodiment, MgO is added to the dielectric ceramic so that the molar amount c is $0.05 \leq c \leq 2.0$ per 100 moles of the main component.

(8) Molar Amount d

Since a Mn component functions for improving the reduction resistance of a dielectric ceramic, the Mn component is added to the main component in a form of MnO in this embodiment. When the molar amount d of MnO is less than 0.05 moles per 100 moles of the main component, the isolating property and the high-temperature load life are significantly deteriorated, resulting in a decrease in the reliability.

On the other hand, when the molar amount d of MnO is higher than 1.3 moles per 100 moles of the main component, the isolating property is also decreased and, further, the relative dielectric constant ∈r is decreased.

Therefore, MnO is added to the dielectric ceramic in this embodiment, so that the molar amount d is $0.05 \leq d \leq 1.3$ per 100 moles of the main component.

(9) Molar Amount e

The relative dielectric constant ∈r and the high-temperature load life under a high electric field can be improved by adding a Cu component together with a V component to a dielectric ceramic. Therefore, in this embodiment, a Cu component is added to the main component in a form of CuO. When the molar amount e of CuO is lower than 0.1 moles per 100 moles of the main component, the effect of the addition of the Cu component is insufficient and the reliability is not improved.

On the other hand, when the molar amount e of CuO is higher than 1.0 mole per 100 moles of the main component, the molar amount e of CuO is excessive so as to decrease the high-temperature load life, which may induce a decrease in the reliability.

Therefore, in this embodiment, CuO is added to the dielectric ceramic so that the molar amount e is in the range of $0.1 \leq e \leq 1.0$ per 100 moles of the main component.

(10) Molar Amount f

The relative dielectric constant ∈r and the high-temperature load life under a high electric field can be improved by adding a V component together with a Cu component to a dielectric ceramic. Therefore, in this embodiment, the V component is added to the main component in a form of $V_2O_5$. When the molar amount f of $V_2O_5$ is lower than 0.02 moles per 100 moles of the main component, the effect of the addition of the V component is insufficient and the reliability is not improved.

On the other hand, when the molar amount f of $V_2O_5$ is higher than 0.15 moles per 100 moles of the main component, the molar amount f of $V_2O_5$ is excessive so as to induce a deterioration in the isolating property.

Therefore, in this embodiment, $V_2O_5$ is added to the dielectric ceramic so that the molar amount f is in the range of $0.02 \leq f \leq 0.15$ per 100 moles of the main component.

(11) Molar Amount g

Since an oxide represented by general formula $X_uO_v$ containing at least Si functions as a sintering additive for low-temperature sintering, the oxide is added to a dielectric ceramic. However, when the molar amount g of $X_uO_v$ is lower than 0.2 moles per 100 moles of the main component, the high-temperature load life may be decreased and, therefore, the reliability may be decreased.

On the other hand, when the molar amount g of $X_uO_v$ is higher than 2 moles per 100 moles of the main component, the temperature characteristic is deteriorated and the X7R characteristic may be not satisfied.

Therefore, in this embodiment, $X_uO_v$ is added to the dielectric ceramic so that the molar amount g is in the range of $0.2 \leq g \leq 2$ per 100 moles of the main component.

As the $X_uO_v$, $Li_2O$, $B_2O_3$, $Na_2O$, $K_2O$, BeO, MgO, CaO, SrO, BaO, $Al_2O_3$, $Ga_2O_3$, $TiO_2$ and $ZrO_2$ may be optionally used, in addition to $SiO_2$.

Further, the average grain size of the dielectric ceramic is preferably 0.21 μm or more but not more than 0.45 μm.

That is to say, the relative dielectric constant βr can be increased by increasing the average grain size of the dielectric ceramic. In order to obtain a desired high relative dielectric constant, the average grain size is preferably 0.21 μm or more.

However, when the average grain size is higher than 0.45 μm, the number of the ceramic grains per one dielectric layer is decreased and, therefore, the dielectric strength and the high-temperature load life are decreased, which may deteriorate the reliability.

Therefore, the average grain size of the dielectric ceramic is preferably 0.21 μm or more but not more than 0.45 μm as described above.

In this embodiment, the composition of the dielectric ceramic is represented by composition formula (A) and is prepared so that the molar ratios x, y, z and m and the molar amounts a to g satisfy the expressions (1) to (11). Therefore, the dielectric ceramic which can be used for fabricating an highly reliable monolithic ceramic capacitor retaining the dielectric characteristic and the temperature characteristic even if the dielectric layers are thinned and a good isolating property, dielectric strength, and high-temperature load life can be provided.

Next, a monolithic ceramic capacitor fabricated using the above-described dielectric ceramic will be described in detail.

FIG. 1 is a cross-sectional view schematically showing a monolithic ceramic capacitor according to an embodiment which is fabricated using a dielectric ceramic according to the present invention.

In this monolithic ceramic capacitor, internal electrodes 2 (2a to 2f) are buried in a ceramic sintered compact 1 formed of a dielectric ceramic according to the present invention; external electrodes 3a and 3b are disposed on both sides of the ceramic sintered compact 1; and, first plating films 4a and 4b are on the surfaces of the external electrodes 3a and 3b, respectively, and second plating films 5a and 5b are disposed on the first plating films 4a and 4b, respectively.

Specifically, the internal electrodes 2a to 2f are arranged in parallel to each other in the laminating direction. The internal electrodes 2a, 2c and 2e are electrically connected to the external electrode 3a and the internal electrodes 2b, 2d and 2f are electrically connected to the external electrode 3b. Thus, capacitance is formed between the oppositely facing internal electrodes 2a, 2c and 2e and internal electrodes 2b, 2d and 2f.

A method for fabricating the monolithic ceramic capacitor will now be described in detail.

Ceramic raw materials, i.e., a Ba compound such as $BaCO_3$, a Ti compound such as $TiO_2$, and, when necessary, a Ca compound such as $CaCO_3$, are weighed so as to satisfy the above-mentioned expressions (1) to (4). Then, these weighed raw materials are placed in a ball mill containing a grinding medium such as partially stabilized zirconium (PSZ) and are wet mixed and pulverized. Then, the materials are heated at a temperature of 1000° C. or more to obtain a main component represented by $(Ba_{1-x-y}Sr_xCa_y)_m(Ti_{1-z}Zr_z)O_3$ and having an average grain size of 0.21 to 0.45 μm.

In addition, Sr and Zr may be contained in the main component because of small amounts of Sr compound and Zr compound contained in the ceramic raw materials and the grinding medium (PSZ) are unavoidably mixed into the main component by the synthesis reaction during the wet pulverizing process.

The average particle size of the main component powder can be readily controlled by suitably determining manufacturing conditions such as the wet pulverizing time.

Then, $BaCO_3$, $MgCO_3$, $MnCO_3$, CuO and $V_2O_5$ are prepared. Further, at least one rare-earth oxide selected from the group consisting of $La_2O_3$, $Ce_2O_3$, $Pr_2O_3$, $Nd_2O_3$, $Sm_2O_3$, $EU_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$ and $Y_2O_3$ is prepared. In addition, $SiO_2$ and a sintering additive such as $Li_2O$ or $B_2O_3$ are prepared.

Then, these additive component raw materials are weighed so as to satisfy the expressions (5) to (11) per 100 moles of the main component. These additives are placed in a ball mill with the main component and then are dried by evaporation to obtain a blend.

Then, the obtained blend is placed in a ball mill and wet mixed with a binder and an organic solvent to produce ceramic slurry. The ceramic slurry is formed into ceramic green sheets by the doctor blade method.

Then, a conductive film having a predetermined pattern is formed on a surface of each ceramic green sheet by screen printing using a conductive paste for internal electrode.

The conductive material contained in the conductive paste for internal electrode is preferably a base metal material a main component of which is Ni, Cu or an alloy thereof, from the viewpoint of a reduction in the cost.

Then, a plurality of ceramic green sheets each having the conductive film thereon is stacked in a predetermined direction. The stacked ceramic green sheets are interposed between ceramic green sheets not having the conductive film and are press-bonded and then cut into a predetermined size to obtain a ceramic laminated body. The ceramic laminated body is debindered at a temperature of 300 to 500° C. and then sintered at a temperature of 1000 to 1200° C. for about 2 hours under a reducing atmosphere of a $H_2$—$N_2$—$H_2O$ gas controlled to an oxygen partial pressure of $10^{-9}$ to $10^{-12}$ MPa. By this process, the conductive film and the ceramic material are sintered together to obtain a ceramic sintered compact 1 (dielectric ceramic) including internal electrodes 2 buried therein.

Then, a conductive paste for external electrode is applied to both sides of the ceramic sintered compact 1 and baked to form external electrodes 3a and 3b.

The conductive material contained in the conductive paste for external electrode is also preferably a base metal material as a main component, of which Ni, Cu, or an alloy thereof, is used from the viewpoint of a reduction in the cost.

In addition, the external electrodes 3a and 3b may be formed by applying a conductive paste for external electrode to both sides of a ceramic laminated body and then sintering the paste together with the ceramic laminated body.

Lastly, first plating films 4a and 4b of Ni, Cu or an Ni—Cu alloy are formed on the surfaces of the external electrodes 3a and 3b, respectively, by electrolytic plating and then second plating films 5a and 5b of solder or tin are formed on the surfaces of the first plating films 4a and 4b, respectively. Thus, a monolithic ceramic capacitor is fabricated.

Since the thus obtained monolithic ceramic capacitor is fabricated by using the dielectric ceramic according to the present invention, a monolithic ceramic capacitor retaining the dielectric characteristic and temperature characteristic even if the dielectric layers are further thinned and having excellent reliability expressing good isolating property and high-temperature load life can be provided.

Specifically, an highly reliable monolithic ceramic capacitor having a high dielectric constant such as a relative dielectric constant ∈r of 3000 or more; a capacitance change of satisfying the X7R characteristic; an isolating property showing a CR product, the product of a capacitance C and an insulation resistance R, of 100Ω·F or more; an dielectric strength showing a breakdown field strength of 100 kV/mm or more; and a durability of 1000 hours of more at a high temperature of 125° C. can be provided.

However, the present invention is not limited to the above-described embodiment. For example, impurities such as Zr, Ni, Fe, Co, Al, Ag, Mo, Ta, Pd, Zn, Hf, Nb and W may be mixed in the crystalline grains or the crystalline grain boundary during the manufacturing process of the above-described monolithic ceramic capacitor. However, these impurities do not affect the electric property of the monolithic ceramic capacitor.

The internal electrode components may be diffused into crystalline grains or to a crystalline grain boundary in the sintering process of the monolithic ceramic capacitor. However, the electric properties of the monolithic ceramic capacitor is not influenced in such a case.

Furthermore, the main component $(Ba_{1-x-y}Sr_xCa_y)_m(Ti_{1-z}Zr_z)O_3$ in the above-mentioned embodiment is produced by a solid-phase method using a Ba compound a Ca compound, and a Ti compound as starting materials. However, the main component may be produced by a hydrolysis method, a hydrothermal synthesis method, or a coprecipitation method. In addition, the Ba compound Ca compound, and Ti compound are not limited to a form of a carbonate salt or oxide. These compounds may be optionally in a form of a nitrate salt, hydroxide, organic acid salt, alkoxide or chelate compound according to the synthesis reaction form.

Next, the Examples of the present invention will be specifically described.

EXAMPLE 1

$BaCO_3$, $SrCO_3$, $CaCO_3$, $TiO_2$ and $ZrO_2$ were prepared as ceramic raw materials and were weighed so that the main components had compositions shown in Tables 1 and 2. Each of the weighed raw material mixtures was placed in a ball mill containing PSZ and was wet mixed and pulverized for 24 hours. Then, the mixture was heated at a temperature of 1100 to 1180° C. to obtain a main component $(Ba_{1-x-y}Sr_xCa_y)_m(Ti_{1-z}Zr_z)O_3$.

In this Example, the Sr component and the Zr component were purposely added to the main component in order to evaluate influences of a Sr component and a Zr component contained in $(Ba,Ca)TiO_3$.

Then, each of the main component raw material powders was subjected to image analysis using a scanning electron microscope (SEM) to measure particle sizes of 300 particles of each powder. The average particle sizes were 0.2 to 0.5 µm as shown in Tables 1 and 2.

Then, $BaCO_3$, $MgCO_3$, $MnCO_3$, CuO, $V_2O_5$ and $SiO_2$ were prepared as additive component materials. Further, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$ and $Y_2O_3$ were prepared as rare-earth oxides $(R_2O_3)$.

Then, the additive component materials were weighed so that the molar amount of each additive component per 100 moles of the main component was as shown in Tables 1 and 2. Each of the weighed raw material mixtures was placed in a ball mill together with the main component and was wet mixed and pulverized for 24 hours. Then, the mixture was dried by evaporation to produce the blend of each of Examples 1 to 38 and Comparative Examples 1 to 23.

Then, each of the blends of Examples 1 to 38 and the Comparative Examples 1 to 23 was put in a ball mill and wet mixed with a polyvinylbutyral binder and ethylalcohol as an organic solvent to prepare ceramic slurry. The ceramic slurry was further processed by the doctor-blade method to produce rectangular ceramic green sheets.

A conductive film was then formed on the surface of each of the ceramic green sheets by screen printing using a conductive paste containing Ni as a main component.

Then, a plurality of ceramic green sheets each having the conductive film thereon was stacked in a predetermined direction. The stacked ceramic green sheets were interposed between ceramic green sheets not having the conductive film and were press-bonded and then cut into a predetermined size to obtain a ceramic laminated body. The ceramic laminated body was debindered at a temperature of 300° C. under a nitrogen atmosphere and then sintered at a temperature of 1200° C. for 2 hr under a reducing atmosphere of a $H_2$—$N_2$—$H_2O$ gas controlled to an oxygen partial pressure of $10^{-10}$ MPa to obtain a ceramic sintered compact including internal electrodes buried therein.

Then, a Cu paste containing a $B_2O_3$—$Li_2O$—$SiO_2$—$BaO$ glass component was applied to both sides of the ceramic sintered compact and baked at a temperature of 800° C. under a nitrogen atmosphere to form external electrodes. Thus, monolithic ceramic capacitors of Examples 1 to 37 and Comparative Examples 1 to 23 were fabricated.

Each of the monolithic ceramic capacitors had an outside dimensions of 1.2 mm in height, 2.0 mm in width and 1.0 mm in thickness. The thickness of each dielectric ceramic layer interposed between the internal electrodes was 1 μm. The number of effective dielectric ceramic layers was 100, and the area of the opposite electrodes per layer was $1.4 \times 10^{-6}$ m$^2$.

Then, 300 grains of each Examples and Comparative Examples were subjected to image analysis with an SEM to calculate the average grain size after sintering. Table 1 shows compositions of main components, molar amounts of additive components and average grain sizes after sintering of Examples 1 to 38. Table 2 shows compositions of main components, molar amounts of additive components and average grain sizes after sintering of Comparative Examples 1 to 23.

TABLE 1

$100\,(Ba_{1-x-y}Sr_xCa_y)_m(Ti_{1-z}Zr_z)O_3 + aBaO + bR_2O_3 + cMgO + dMnO + eCuO + fV_2O_3 + gSiO_2$

| | x | y | z | m | 100m + a | R | b | c | d | e | f | g |
|---|---|---|---|---|---|---|---|---|---|---|---|---|
| 1 | 0.35 | 0.02 | 0.06 | 0.004 | 0.995 | 101.2 | Y/Pr/Yb | 0.13 (0.04/0.04/0.05) | 0.3 | 0.3 | 0.8 | 0.03 | 1.2 | 0.35 |
| 2 | 0.3 | 0.04 | 0.05 | 0.005 | 0.993 | 101.1 | Ho | 0.17 | 0.6 | 0.15 | 0.5 | 0.04 | 1.2 | 0.3 |
| 3 | 0.3 | 0.04 | 0.06 | 0.008 | 0.995 | 101.0 | Y/Dy | 0.17 (0.1/0.07) | 0.5 | 0.1 | 0.6 | 0.11 | 1.2 | 0.3 |
| 4 | 0.25 | 0.03 | 0.07 | 0.02 | 1.002 | 101.1 | Dy | 0.17 | 0.4 | 0.15 | 0.6 | 0.04 | 1 | 0.3 |
| 5 | 0.35 | 0.04 | 0.05 | 0.02 | 1.002 | 101.3 | Ho | 0.23 | 0.7 | 0.15 | 0.6 | 0.06 | 0.9 | 0.35 |
| 6 | 0.4 | 0.03 | 0.04 | 0.01 | 1.004 | 100.9 | Yb | 0.2 | 0.4 | 0.25 | 0.6 | 0.05 | 1 | 0.4 |
| 7 | 0.4 | 0.04 | 0.04 | 0.01 | 1.004 | 100.7 | Y | 0.17 | 0.5 | 0.2 | 0.4 | 0.07 | 1.2 | 0.4 |
| 8 | 0.35 | 0.03 | 0.06 | 0.01 | 0.998 | 100.8 | Y/Ho | 0.15 (0.1/0.05) | 0.4 | 0.25 | 0.4 | 0.03 | 1 | 0.35 |
| 9 | 0.4 | 0.03 | 0.07 | 0.01 | 0.995 | 101.0 | Y/Yb | 0.23 (0.1/0.13) | 0.3 | 0.1 | 0.8 | 0.08 | 1.2 | 0.4 |
| 10 | 0.35 | 0.02 | 0.06 | 0.023 | 0.998 | 100.7 | Dy/Ho | 0.15 (0.1/0.05) | 0.5 | 0.2 | 0.5 | 0.03 | 0.9 | 0.35 |
| 11 | 0.4 | 0.03 | 0.06 | 0.006 | 0.998 | 101.1 | Dy/La | 0.17 (0.1/0.07) | 0.7 | 0.3 | 0.7 | 0.07 | 0.9 | 0.4 |
| 12 | 0.35 | 0.04 | 0.06 | 0.01 | 0.990 | 101.1 | Ho/Yb | 0.13 (0.05/0.08) | 0.3 | 0.3 | 0.6 | 0.1 | 1 | 0.35 |
| 13 | 0.3 | 0.03 | 0.05 | 0.023 | 0.990 | 101.2 | Y/Dy/Lu | 0.15 (0.05/0.05/0.05) | 0.4 | 0.15 | 0.8 | 0.04 | 1 | 0.3 |
| 14 | 0.25 | 0.02 | 0.05 | 0.02 | 0.993 | 100.9 | Y/Ce/Yb | 0.13 (0.05/0.05/0.03) | 0.4 | 0.3 | 0.6 | 0.05 | 0.8 | 0.25 |
| 15 | 0.45 | 0.03 | 0.03 | 0.005 | 0.993 | 101.3 | Y/Ho/Dy | 0.2 (0.1/0.05/0.05) | 0.6 | 0.25 | 0.5 | 0.08 | 1.1 | 0.45 |
| 16 | 0.3 | 0 | 0.04 | 0.01 | 0.993 | 100.8 | Ho | 0.15 | 0.5 | 0.15 | 0.4 | 0.06 | 1.1 | 0.3 |
| 17 | 0.35 | 0.05 | 0.06 | 0.02 | 1.004 | 100.9 | Y/Ho/Yb/Nd | 0.2 (0.05/0.05/0.05/0.05) | 0.5 | 0.25 | 0.5 | 0.05 | 0.8 | 0.35 |
| 18 | 0.3 | 0.02 | 0.02 | 0.008 | 1.004 | 101.0 | Y | 0.2 | 0.4 | 0.3 | 0.5 | 0.11 | 1.1 | 0.3 |
| 19 | 0.3 | 0.03 | 0.08 | 0.01 | 1.004 | 101.0 | Dy | 0.15 | 0.3 | 0.25 | 0.4 | 0.11 | 1.1 | 0.3 |
| 20 | 0.35 | 0.03 | 0.06 | 0 | 1.000 | 101.2 | Dy | 0.13 | 0.5 | 0.25 | 0.6 | 0.03 | 1.1 | 0.3 |
| 21 | 0.3 | 0.02 | 0.04 | 0.05 | 1.000 | 100.8 | Yb | 0.23 | 0.5 | 0.15 | 0.4 | 0.07 | 0.8 | 0.35 |
| 22 | 0.4 | 0.03 | 0.04 | 0.005 | 1.000 | 100.2 | Y/Dy | 0.13 (0.05/0.08) | 0.4 | 0.25 | 0.7 | 0.08 | 1.2 | 0.4 |
| 23 | 0.35 | 0.03 | 0.06 | 0.01 | 1.020 | 102.0 | Sn/Ho/Yb | 0.23 (0.08/0.08/0.07) | 0.6 | 0.25 | 0.4 | 0.06 | 1.1 | 0.35 |
| 24 | 0.35 | 0.04 | 0.04 | 0.02 | 0.998 | 101.0 | Y/Eu/Yb/Tb | 0.05 (0.01/0.01/0.01/0.02) | 0.7 | 0.2 | 0.4 | 0.06 | 1.2 | 0.35 |
| 25 | 0.3 | 0.02 | 0.06 | 0.005 | 0.998 | 101.2 | Yb | 0.5 | 0.5 | 0.15 | 0.8 | 0.04 | 0.8 | 0.3 |
| 26 | 0.25 | 0.04 | 0.06 | 0.007 | 0.990 | 101.3 | Dy/Yb | 0.2 (0.1/0.1) | 0.05 | 0.25 | 0.4 | 0.07 | 1.1 | 0.3 |
| 27 | 0.3 | 0.02 | 0.05 | 0.005 | 0.990 | 100.8 | Ho/Yb | 0.17 (0.1/0.07) | 2 | 0.25 | 0.6 | 0.11 | 1.1 | 0.3 |
| 28 | 0.3 | 0.03 | 0.06 | 0.004 | 0.993 | 100.9 | Y/Dy/Gd | 0.23 (0.1/0.05/0.08) | 0.4 | 0.05 | 0.4 | 0.06 | 0.8 | 0.3 |
| 29 | 0.25 | 0.03 | 0.06 | 0.02 | 1.010 | 101.3 | Y/Er/Yb | 0.13 (0.05/0.05/0.03) | 0.3 | 1.3 | 0.4 | 0.04 | 1.2 | 0.3 |
| 30 | 0.3 | 0.02 | 0.04 | 0.015 | 1.010 | 101.2 | Ho | 0.23 | 0.6 | 0.25 | 0.1 | 0.08 | 0.8 | 0.3 |
| 31 | 0.4 | 0.04 | 0.06 | 0.005 | 0.993 | 100.9 | Yb | 0.2 | 0.4 | 0.15 | 1 | 0.08 | 1.2 | 0.4 |
| 32 | 0.35 | 0.03 | 0.06 | 0.007 | 0.995 | 101.2 | Dy | 0.13 | 0.5 | 0.25 | 0.8 | 0.02 | 1.2 | 0.35 |
| 33 | 0.3 | 0.03 | 0.04 | 0.005 | 0.998 | 100.9 | Ho | 0.17 | 0.4 | 0.15 | 0.5 | 0.15 | 0.8 | 0.3 |
| 34 | 0.4 | 0.04 | 0.06 | 0.004 | 0.998 | 101.0 | Dy | 0.23 | 0.7 | 0.25 | 0.4 | 0.03 | 0.2 | 0.4 |
| 35 | 0.35 | 0.02 | 0.03 | 0.006 | 1.000 | 101.1 | Dy/Tm | 0.13 (0.04/0.09) | 0.7 | 0.25 | 0.7 | 0.05 | 2 | 0.35 |
| 36 | 0.21 | 0.03 | 0.05 | 0.008 | 0.998 | 101.0 | Ho/Dy | 0.15 (0.1/0.05) | 0.5 | 0.25 | 0.7 | 0.08 | 1.8 | 0.21 |
| 37 | 0.4 | 0.03 | 0.01 | 0.005 | 0.993 | 101.3 | Y/Yb | 0.17 (0.1/0.07) | 0.7 | 0.25 | 0.4 | 0.08 | 1.2 | 0.4 |
| 38 | 0.35 | 0.02 | 0 | 0.007 | 0.997 | 101.5 | Y/Dy | 0.17 (0.15/0.02) | 0.4 | 0.2 | 0.6 | 0.07 | 1 | 0.35 |

TABLE 2

$100\ (Ba_{1-x-y}Sr_xCa_y)_m(Ti_{1-z}Zr_z)O_3 + aBaO + bR_2O_3 + cMgO + dMnO + eCuO + fV_2O_3 + gSiO_2$

|   | x | y | z | m | 100m + a | R | b | c | d | e | f | g |
|---|---|---|---|---|---|---|---|---|---|---|---|---|
| 1 | 0.3 | 0.1* | 0.05 | 0.01 | 1.002 | 100.7 | Y/Ho | 0.23 (0.1/0.13) | 0.6 | 0.15 | 0.6 | 0.07 | 0.9 | 0.3 |
| 2 | 0.35 | 0.02 | 0.09* | 0.005 | 0.993 | 100.8 | Y | 0.13 | 0.4 | 0.15 | 0.8 | 0.06 | 1.2 | 0.35 |
| 3 | 0.4 | 0.03 | 0.06 | 0.1* | 0.998 | 101.0 | Yb | 0.15 | 0.5 | 0.2 | 0.7 | 0.05 | 1.3 | 0.35 |
| 4 | 0.35 | 0.03 | 0.07 | 0.021 | 0.986* | 100.5 | Ho/Yb | 0.15 (0.11/0.04) | 0.7 | 0.25 | 0.6 | 0.05 | 1.2 | 0.45 |
| 5 | 0.3 | 0.02 | 0.07 | 0.01 | 0.995 | 100.0* | Dy | 0.13 | 0.3 | 0.1 | 0.8 | 0.07 | 0.9 | 0.35 |
| 6 | 0.3 | 0.02 | 0.03 | 0.004 | 1.012 | 102.5* | Ho | 0.17 | 0.7 | 0.15 | 0.5 | 0.03 | 0.9 | 0.3 |
| 7 | 0.35 | 0.03 | 0.04 | 0.023 | 1.010 | 101.3 | Yb | 0.03* | 0.4 | 0.2 | 0.6 | 0.04 | 1.1 | 0.35 |
| 8 | 0.4 | 0.02 | 0.05 | 0.015 | 1.000 | 101.1 | Y | 0.6* | 0.6 | 0.2 | 0.7 | 0.05 | 1.1 | 0.4 |
| 9 | 0.3 | 0.03 | 0.04 | 0.006 | 1.000 | 100.9 | Dy | 0.17 | 0.02* | 0.1 | 0.6 | 0.07 | 0.9 | 0.4 |
| 10 | 0.35 | 0.03 | 0.04 | 0.008 | 1.000 | 101.2 | Dy/Ho | 0.2 (0.1/0.1) | 2.4* | 0.2 | 0.5 | 0.06 | 1.2 | 0.35 |
| 11 | 0.4 | 0.04 | 0.04 | 0.01 | 0.998 | 101.1 | Y/Ho/Lu | 0.23 (0.08/0.08/0.07) | 0.6 | 0.02* | 0.6 | 0.11 | 1 | 0.4 |
| 12 | 0.35 | 0.04 | 0.03 | 0.01 | 0.995 | 101.0 | Y | 0.17 | 0.4 | 1.6* | 0.5 | 0.05 | 1.2 | 0.35 |
| 13 | 0.3 | 0.04 | 0.05 | 0.008 | 0.995 | 100.7 | Y/Dy | 0.2 (0.1/0.1) | 0.6 | 0.2 | 0* | 0* | 0.9 | 0.3 |
| 14 | 0.3 | 0.03 | 0.04 | 0.007 | 1.003 | 100.8 | Dy/Ho | 0.13 (0.08/0.05) | 0.4 | 0.25 | 0* | 0.05 | 1 | 0.3 |
| 15 | 0.35 | 0.03 | 0.04 | 0.005 | 1.002 | 100.8 | Dy | 0.2 | 0.5 | 0.15 | 0.05* | 0.07 | 1 | 0.35 |
| 16 | 0.35 | 0.02 | 0.05 | 0.005 | 0.998 | 101.0 | Y/Yb | 0.15 (0.04/0.1) | 0.4 | 0.2 | 1.5* | 0.05 | 1.1 | 0.5 |
| 17 | 0.3 | 0.02 | 0.06 | 0.009 | 1.004 | 100.9 | Dy/Ho | 0.15 (0.1/0.05) | 0.7 | 0.2 | 0.5 | 0* | 1.1 | 0.3 |
| 18 | 0.35 | 0.02 | 0.07 | 0.006 | 0.995 | 100.8 | Y/Dy/Ho | 0.15 (0.05/0.05/0.05) | 0.4 | 0.15 | 0.4 | 0.01* | 1.1 | 0.35 |
| 19 | 0.4 | 0.02 | 0.07 | 0.008 | 0.998 | 100.7 | Y/Dy/Yb | 0.2 (0.1/0.03/0.07) | 0.5 | 0.25 | 0.6 | 0.18* | 0.8 | 0.4 |
| 20 | 0.35 | 0.03 | 0.06 | 0.01 | 0.998 | 101.3 | Ho | 0.23 | 0.6 | 0.15 | 0.4 | 0.06 | 0.05* | 0.35 |
| 21 | 0.3 | 0.03 | 0.06 | 0.007 | 0.993 | 100.9 | Y | 0.13 | 0.3 | 0.15 | 0.6 | 0.07 | 2.5* | 0.35 |
| 22 | 0.2 | 0.03 | 0.06 | 0.02 | 1.000 | 101.1 | Y/Ho/Dy | 0.15 (0.03/0.04/0.08) | 0.3 | 0.15 | 0.5 | 0.1 | 1 | 0.20* |
| 23 | 0.5 | 0.02 | 0.04 | 0.008 | 1.002 | 101.0 | Y | 0.23 | 0.4 | 0.15 | 0.6 | 0.11 | 0.9 | 0.6* |

*VALUES OUTSIDE THE RANGE SPECIFIED BY THE PRESENT INVENTION

Further, the capacitance C and the dielectric loss tan δ were measured using an automatic bridge-type meter at a frequency of 1 kHz, an effective voltage of 0.5 Vrms and at a temperature of 25° C. From the capacitance thus measured, the relative dielectric constant εr was calculated.

Then, the insulation resistance R when a direct current voltage of 10 V was applied for 1 min at a temperature of 125° C. was measured using an insulation resistance meter. Further, the CR product was calculated by multiplying the capacitance C by the insulation resistance R.

The breakdown field strength was measured by increasing the voltage at a rate of 100 V/s, and the dielectric strength to direct current voltage was evaluated.

The temperature characteristic was evaluated by measuring the maximum capacitance change (ΔC/C$_{25}$)max in the range of −55° C. to +125° C. based on the capacitance at +25° C. If a capacitance change (ΔC/C$_{25}$) is within ±15%, it means that the X7R characteristic specified by the EIA is satisfied.

The high-temperature load life was evaluated by conducting a high-temperature load test. Specifically, 100 test pieces of each Examples and Comparative Examples were used. A voltage of 10 V (10 kV/mm) or 20 V (20 kV/mm) was applied to each test piece at a high temperature of 125° C., while measuring the insulation resistance which varied time-dependently. Then, 1000 hours after the start of the test, a test piece of which insulation resistance R had decreased to 200 kΩ or less was determined to be a reject. The number of the rejects was counted to evaluate the high-temperature load life.

Table 3 shows the results of Examples, and Table 4 shows the results of Comparative Examples.

TABLE 3

Table 3 shows the results of Examples, and Table 4 shows the results of Comparative Examples.

|   |   |   |   |   |   | 10 kV/mm | 20 kV/mm |
|---|---|---|---|---|---|---|---|
| 1 | 3520 | 5.5 | −13.4 | 136 | 250 | 0/100 | 0/100 |
| 2 | 3510 | 5.1 | −13.7 | 139 | 250 | 0/100 | 0/100 |
| 3 | 3460 | 5.7 | −10.2 | 150 | 180 | 0/100 | 0/100 |
| 4 | 3400 | 5.6 | −13.2 | 139 | 250 | 0/100 | 0/100 |
| 5 | 3450 | 5.2 | −12.4 | 143 | 220 | 0/100 | 0/100 |
| 6 | 3680 | 5.3 | −12.3 | 142 | 220 | 0/100 | 0/100 |
| 7 | 3770 | 5.6 | −11.7 | 145 | 200 | 0/100 | 0/100 |
| 8 | 3580 | 5.6 | −13.4 | 136 | 250 | 0/100 | 0/100 |
| 9 | 3550 | 6.1 | −11.3 | 146 | 190 | 0/100 | 0/100 |
| 10 | 3600 | 5.7 | −13.4 | 136 | 250 | 0/100 | 0/100 |
| 11 | 3470 | 5.6 | −11.4 | 145 | 200 | 0/100 | 0/100 |
| 12 | 3460 | 5.8 | −9.6 | 149 | 180 | 0/100 | 0/100 |
| 13 | 3470 | 5.1 | −13.2 | 139 | 250 | 0/100 | 0/100 |
| 14 | 3490 | 5.3 | −12.1 | 142 | 240 | 0/100 | 0/100 |
| 15 | 3750 | 5.3 | −10.9 | 146 | 160 | 0/100 | 0/100 |
| 16 | 3660 | 5.3 | −12.4 | 101 | 130 | 0/100 | 0/100 |
| 17 | 3470 | 5.5 | −12.3 | 142 | 230 | 0/100 | 0/100 |
| 18 | 3630 | 4.9 | −9.7 | 150 | 180 | 0/100 | 0/100 |
| 19 | 3360 | 6.2 | −9.5 | 150 | 180 | 0/100 | 0/100 |
| 20 | 3490 | 5.4 | −13.6 | 124 | 120 | 0/100 | 0/100 |
| 21 | 3600 | 5.2 | −11.6 | 145 | 220 | 0/100 | 0/100 |
| 22 | 3850 | 5.8 | −11.0 | 146 | 190 | 0/100 | 0/100 |
| 23 | 3310 | 5.2 | −12.4 | 143 | 220 | 0/100 | 0/100 |
| 24 | 3670 | 5.3 | −12.4 | 143 | 220 | 0/100 | 0/100 |
| 25 | 3290 | 4.9 | −14.5 | 139 | 250 | 0/100 | 0/100 |
| 26 | 3420 | 5.5 | −11.3 | 145 | 220 | 0/100 | 0/100 |

TABLE 3-continued

Table 3 shows the results of Examples, and Table 4 shows the results of Comparative Examples.

| | | | | | 10 kV/mm | 20 kV/mm |
|---|---|---|---|---|---|---|
| 27 | 3360 | 5.1 | −11.6 | 150 | 180 | 0/100 | 0/100 |
| 28 | 3460 | 5.5 | −12.2 | 143 | 230 | 0/100 | 0/100 |
| 29 | 3260 | 5.2 | −11.6 | 139 | 250 | 0/100 | 0/100 |
| 30 | 3480 | 5.0 | −11.1 | 146 | 210 | 0/100 | 0/100 |
| 31 | 3570 | 5.8 | −11.3 | 146 | 190 | 0/100 | 0/100 |
| 32 | 3500 | 5.4 | −14.2 | 133 | 260 | 0/100 | 0/100 |
| 33 | 3120 | 5.4 | −7.4 | 153 | 140 | 0/100 | 0/100 |
| 34 | 3380 | 5.3 | −12.5 | 136 | 240 | 0/100 | 0/100 |
| 35 | 3810 | 5.1 | −14.2 | 142 | 230 | 0/100 | 0/100 |
| 36 | 3180 | 6.2 | −10.8 | 148 | 230 | 0/100 | 0/100 |
| 37 | 3770 | 4.7 | −11.4 | 146 | 190 | 0/100 | 6/100 |
| 38 | 3690 | 3.1 | −12.7 | 137 | 170 | 0/100 | 9/100 |

TABLE 4

| | | | | | 10 kV/mm | 20 kV/mm |
|---|---|---|---|---|---|---|
| 1 | 3440 | 5.1 | −13.1 | 145 | 220 | 1/100 | 2/100 |
| 2 | 2910 | 6.4 | −12.3 | 143 | 220 | 0/100 | 0/100 |
| 3 | 3790 | 6.3 | −13.4 | 132 | 210 | 1/100 | 3/100 |
| 4 | 4240 | 7.1 | −14.9 | 64 | 20 | 100/100 | 100/100 |
| 5 | 3980 | 5.7 | −15.6 | 145 | 220 | 2/100 | 21/100 |
| 6 | 2950 | 4.1 | −13.9 | 136 | 260 | 0/100 | 0/100 |
| 7 | 3620 | 5.2 | −12.8 | 139 | 240 | 10/100 | 41/100 |
| 8 | 3530 | 5.0 | −15.7 | 142 | 220 | 0/100 | 0/100 |
| 9 | 4010 | 6.5 | −16.2 | 145 | 220 | 5/100 | 24/100 |
| 10 | 2840 | 4.8 | −12.3 | 143 | 220 | 0/100 | 0/100 |
| 11 | 3620 | 5.5 | −10.0 | 150 | 30 | 100/100 | 100/100 |
| 12 | 2910 | 4.7 | −10.7 | 142 | 90 | 0/100 | 0/100 |
| 13 | 3390 | 4.8 | −12.3 | 73 | 80 | 100/100 | 100/100 |
| 14 | 3420 | 4.3 | −11.3 | 92 | 40 | 9/100 | 43/100 |
| 15 | 3690 | 5.4 | −11.7 | 95 | 70 | 3/100 | 29/100 |
| 16 | 3880 | 7.2 | −14.4 | 140 | 150 | 3/100 | 6/100 |
| 17 | 3380 | 4.2 | −12.5 | 71 | 280 | 11/100 | 55/100 |
| 18 | 3590 | 5.8 | −14.7 | 75 | 270 | 7/100 | 43/100 |
| 19 | 3050 | 6.5 | −5.6 | 155 | 50 | 0/100 | 0/100 |
| 20 | 3260 | 5.2 | −11.0 | 143 | 220 | 3/100 | 4/100 |
| 21 | 4030 | 5.8 | −16.1 | 145 | 220 | 0/100 | 0/100 |
| 22 | 2760 | 4.3 | −10.3 | 149 | 220 | 0/100 | 0/100 |
| 23 | 3820 | 6.0 | −8.8 | 78 | 140 | 7/100 | 26/100 |

As is obvious from Tables 2 and 4, the molar ratio x of the Sr component in the A site in Comparative Example 1, was a high value of 0.1. Although the number of rejected test pieces was 1 per 100 test pieces, rejects were included in test pieces even if the applied voltage in the high-temperature load test was 10 kV/mm. Thus, it was confirmed that a decrease in the manufacturing yield would be induced.

In Comparative Example 2, since the molar ratio y of the Ca component in the A site was a high value of 0.09, the relative dielectric constant ∈r was reduced to lower than 3000, i.e., 2910, and the dielectric characteristic was deteriorated although the isolating property, dielectric strength, and high-temperature load life were good and the temperature characteristic of the capacitance satisfied the X7R characteristic.

In Comparative Example 3, since the molar ratio z of the Zr component in the B site was a high value of 0.1, as in Comparative Example 1, and although the number of rejected test pieces was 1 per 100 test pieces, rejects were included in test pieces even if the applied voltage in the high-temperature load test was 10 kV/mm. Thus, it was confirmed that a decrease in the manufacturing yield would be induced.

In Comparative Example 4, since the molar ratio between the A site and the B site in the main component was a low value of 0.986, the DC breakdown field strength was a low value of 64 kV/mm. Thus, it was confirmed that the high-temperature load life was significantly deteriorated and the reliability was poor.

In Comparative Example 5, since the total molar amount (100 m+a) of the Ba component was a low value of 100.0, the maximum capacitance change $(\Delta C/C_{25})$max based on temperature change was −15.6%, which did not satisfy the X7R characteristic. In addition, 2 rejects were included in 100 test pieces when the applied voltage in the high-temperature load test was 10 kV/mm, and 21 rejects were included in 100 test pieces when the applied voltage was 20 kV/mm. Thus, it was confirmed that a decrease in the manufacturing yield would be induced.

In Comparative Example 6, the isolating property, dielectric strength and high-temperature load life were good and the temperature characteristic of the capacitance satisfied the X7R characteristic. However, since the total molar amount (100 m+a) of the Ba component was a high value of 102.5, the relative dielectric constant ∈r was reduced to lower than 3000, i.e., 2950, resulting in a deterioration in the dielectric characteristic.

In Comparative Example 7, since the molar amount b of the rare-earth oxide $Yb_2O_3$ per 100 moles of the main component was a low value of 0.03 mole, 10 rejects were included in 100 test pieces when the applied voltage in the high-temperature load test was 10 kV/mm, and 41 rejects were included in 100 test pieces when the applied voltage was 20 kV/mm. Thus, it was confirmed that a decrease in the manufacturing yield would be induced.

In Comparative Example 8, since the molar amount b of the rare-earth oxide $Yb_2O_3$ per 100 moles of the main component was a high value of 0.6 mole, the maximum capacitance change $(\Delta C/C_{25})$max based on temperature change was −15.7%. Thus, it was confirmed that the X7R characteristic was not satisfied.

In Comparative Example 9, since the molar amount c of MgO per 100 moles of the main component was a low value of 0.02 mole, the maximum capacitance change $(\Delta C/C_{25})$ max based on temperature change was −16.2%. Thus, the X7R characteristic was not satisfied. In addition, 5 rejects were included in 100 test pieces when the applied voltage in the high-temperature load test was 10 kV/mm, and 24 rejects were included in 100 test pieces when the applied voltage was 20 kV/mm. Thus, it was confirmed that a decrease in the manufacturing yield would be induced.

In Comparative Example 10, the isolating property, dielectric strength, and high-temperature load life were good and the temperature characteristic of the capacitance satisfied the X7R characteristic. However, since the molar amount c of MgO per 100 moles of the main component was a high value of 0.7 mole, the relative dielectric constant ∈r was reduced lower than 3000, i.e., 2840, resulting in a deterioration in the dielectric characteristic.

In Comparative Example 11, since the molar amount d of MnO per 100 moles of the main component was a low value of 0.02 mole, the CR product was a low value of 30Ω·F and the high-temperature load life was significantly deteriorated. Thus, it was confirmed that the isolating property and the reliability were decreased.

In Comparative Example 12, since the molar amount d of MnO per 100 moles of the main component was a high value of 2.4 moles, the CR product was a low value of 90Ω·F to decrease the isolating property. In addition, the relative dielectric constant ∈r was reduced to lower than 3000, i.e., 2910 to induce a deterioration in the dielectric characteristic.

In Comparative Example 13, since neither CuO nor $V_2O_5$ were contained, the DC breakdown field strength was a low value of 73 kV/mm to decrease the dielectric strength and the CR product was a low value of 80Ω·F to decrease the isolating property. In addition, it was confirmed that the high-temperature load life was low to decrease the reliability.

In Comparative Example 14, it was confirmed that since CuO was not present although 0.05 mole of $V_2O_5$ per 100 moles of the main component were present, the CR product was a low value of 40Ω·F to decrease the isolating property. In addition, 9 rejects were included in 100 test pieces when the applied voltage in the high-temperature load test was 10 kV/mm, and 43 rejects were included in 100 test pieces when the applied voltage was 20 kV/mm. Thus, it was confirmed that a decrease in the manufacturing yield would be induced.

In Comparative Example 15, it was confirmed that since the content of CuO was low, i.e., 0.05 mole per 100 moles of the main component, the CR product was a low value of 70Ω·F to decrease the isolating property even though CuO was present. In addition, 3 rejects were included in 100 test pieces when the applied voltage in the high-temperature load test was 10 kV/mm, and 29 rejects were included in 100 test pieces when the applied voltage was 20 kV/mm. Thus, it was confirmed that a decrease in the manufacturing yield would be induced.

In Comparative Example 16, the molar amount e of CuO per 100 moles of the main component was a high value of 1.5 moles. Three rejects were included in 100 test pieces when the applied voltage in the high-temperature load test was 10 kV/mm, and 6 rejects were included in 100 test pieces when the applied voltage was 20 kV/mm. Thus, it was confirmed that a decrease in the manufacturing yield would be induced.

In Comparative Example 17, it was confirmed that since $V_2O_5$ was not present although 0.5 mole of CuO was contained in 100 moles of the main component, the DC breakdown field strength was a low value of 71 kV/mm to decrease the dielectric strength. In addition, 11 rejects were included in 100 test pieces when the applied voltage in the high-temperature load test was 10 kV/mm, and 55 rejects were included in 100 test pieces when the applied voltage was 20 kV/mm. Thus, it was confirmed that a decrease in the manufacturing yield would be induced.

In Comparative Example 18, it was confirmed that since the content of $V_2O_5$ was low, i.e., 0.01 mole per 100 moles of the main component, the DC breakdown field strength was a low value of 75 kV/mm to decrease the dielectric strength although $v_2O_3$ was present. In addition, 7 rejects were included in 100 test pieces when the applied voltage in the high-temperature load test was 10 kV/mm, and 43 rejects were included in 100 test pieces when the applied voltage was 20 kV/mm. Thus, it was confirmed that a decrease in the manufacturing yield would be induced.

In Comparative Example 19, it was confirmed that since the molar amount f of $V_2O_5$ per 100 moles of the main component was a high value of 0.18 mole, the CR product was a low value of 50Ω·F to decrease the isolating property.

Further, as shown in Comparative Examples 13 to 19, when CuO was not added or the addition amount was too small, the CR product was low, resulting in a decrease in the isolating property. When $V_2O_5$ was not added or the addition amount was too small, the DC breakdown field strength was low, resulting in a decrease in the dielectric strength. As described below, both the isolating property and the dielectric strength can be improved by adding both CuO and $V_2O_5$, and, therefore, the high-temperature load life under a high electric field can be improved.

In Comparative Example 20, the molar amount g of $SiO_2$ was low, i.e., 0.05 mole per 100 moles of the main component. Three rejects were included in 100 test pieces when the applied voltage in the high-temperature load test was 10 kV/mm, and 4 rejects were included in 100 test pieces when the applied voltage was 20 kV/mm. Thus, it was confirmed that a decrease in the manufacturing yield would be induced.

In Comparative Example 21, the molar amount g of $SiO_2$ was high, i.e., 2.5 moles per 100 moles of the main component. Therefore, the maximum capacitance change $(\Delta C/C_{25})$max based on the temperature change was -16.1%. Thus, it was confirmed that the X7R characteristic was not satisfied to deteriorate the temperature characteristic.

In Comparative Example 22, it was confirmed that since the average grain size of the ceramic sintered compact (dielectric ceramic) was 0.2 μm, which was too small, the relative dielectric constant εr was reduced to lower than 3000, i.e., 2760 to induce a decrease in the dielectric characteristic.

In Comparative Example 23, it was confirmed that since the average grain size of the ceramic sintered compact (dielectric ceramic) was 0.6 μm, which was too large, the number of the ceramic grains per one dielectric layer was decreased and, therefore, the DC breakdown field strength was a low value of 78 kV/mm to decrease the dielectric strength. In addition, 7 rejects were included in 100 test pieces when the applied voltage in the high-temperature load test was 10 kV/mm, and 26 rejects were included in 100 test pieces when the applied voltage was 20 kV/mm. Thus, it was confirmed that a decrease in the manufacturing yield would be induced.

On the other hand, as is obvious from Tables 1 and 3, in each of Examples 1 to 38, $0 \leq x \leq 0.05$, $0 \leq y \leq 0.08$, $0 \leq z \leq 0.05$, $0.990 \leq m$, $100.2 \leq (100 m+a) \leq 102$, $0.05 \leq b \leq 0.5$, $0.05 \leq c \leq 2$, $0.05 \leq d \leq 1.3$, $0.1 \leq e \leq 1.0$, $0.02 \leq f \leq 0.15$, and $0.2 \leq g \leq 2$; and the average grain size was in the range of 0.21 to 0.45 μm. Therefore, the relative dielectric constant εr was 3000 or more, the capacitance change $(\Delta C/C_{25})$max satisfied the X7R characteristic, the DC breakdown field strength was 100 kV/mm or more, the CR product was 140Ω·F or more, and the high-temperature load life was 1000 hours or more when a voltage of 10 kV/mm was applied at a high temperature of 125° C. Thus, it was confirmed that monolithic ceramic capacitors superior in dielectric characteristic, temperature characteristic, dielectric strength, isolating property, and reliability could be provided.

As is obvious from the comparison between Examples 1 to 36 and Examples 37 and 38, since Ca was not contained in the dielectric ceramic composition or the molar amount y of Ca was too small (0.01) in Examples 37 and 38, 6 and 9 rejects were included in 100 test pieces of Examples 37 and 38, respectively, when the applied voltage was 20 kV/mm although the high-temperature load life was satisfactory when the applied voltage in the high-temperature load test was 10 kV/mm. On the other hand, in each of Examples 1 to 36, since the content of Ca in the dielectric ceramic was controlled so that the molar amount y was $0.02 \leq y \leq 0.08$, an endurance time of 1000 hours or more was achieved even if a voltage of 20 kV/mm was applied. Thus, it was confirmed that the high-temperature load life could be further improved by adjusting the molar ratio y to $0.02 \leq y \leq 0.08$.

In the ceramic sintered compacts according to Examples 1 to 38, it was confirmed that the particle growth due to sintering was negligible and the average grain size of the ceramic sintered compact was almost the particle size as that of the main component.

EXAMPLE 2

$Li_2O$, $B_2O_3$, CaO, $Al_2O_3$, MgO, BaO, $K_2O$, BeO, SrO, GaO, $TiO_2$, and $ZrO_2$ were prepared. Monolithic ceramic capacitors according to Examples 41 to 52 were fabricated so that the composition of each of the monolithic ceramic capacitors was the same as that of Example 3, as a standard sample, in [EXAMPLE 1] with the exception of the $SiO_2$ site. The $SiO_2$ site was adjusted so as to have the component composition shown in Table 5.

Table 5 shows sintering additives, molar amounts thereof, average grain sizes after sintering, and sintering temperatures in Example 3 and Examples 41 to 52.

TABLE 5

| | $gX_nO_v$ | | | |
|---|---|---|---|---|
| | X | g | | |
| 3 | Si | 1.2 | 0.35 | 1200 |
| 41 | Si/Li | 1.7 (1.19/0.51) | 0.40 | 1080 |
| 42 | Si/B | 0.9 (0.6/0.3) | 0.35 | 1120 |
| 43 | Si/Ca/Al | 0.7 (0.42/0.14/0.14) | 0.30 | 1140 |
| 44 | Si/Li/Ca | 1.5 (1.35/0.075/0.075) | 0.35 | 1100 |
| 45 | Si/B/Mg | 1.8 (1.26/0.36/0.18) | 0.40 | 1080 |
| 46 | Si/Mg/Ba | 0.5 (0.35/0.05/0.1) | 0.30 | 1150 |
| 47 | Si/B/K | 1.0 (0.8/0.15/0.05) | 0.35 | 1140 |
| 48 | Si/Be/Sr | 1.4 (0.84/0.28/0.28) | 0.45 | 1120 |
| 49 | Si/Li/B | 0.8 (0.56/0.16/0.08) | 0.25 | 1140 |
| 50 | Si/Ti/Ga | 0.3 (0.16/0.09/0.05) | 0.25 | 1150 |
| 51 | Si/Li/Na | 2.0 (1.6/0.2/0.2) | 0.45 | 1040 |
| 52 | Si/B/Zr | 0.4 (0.24/0.08/0.08) | 0.30 | 1150 |

As is obvious from Table 5, in Examples 41 to 52, the average grain sizes after sintering were advantageously 0.21 to 0.45 μm. Furthermore, it was confirmed that sintering at a temperature lower than that in Example 3 was possible.

Next, with respect to Examples 41 to 52, the relative dielectric constant εr, dielectric loss tan δ, maximum capacitance change $(\Delta C/C_{25})$max, DC breakdown field and CR product were measured and the high-temperature load test (20 kV/mm) was conducted, as in [EXAMPLE 1].

Table 6 shows the results, including the results of Example 3.

TABLE 6

| | | | | | | 20 kV/mm |
|---|---|---|---|---|---|---|
| 3 | 3460 | 5.7 | −10.2 | 120 | 180 | 0/100 |
| 41 | 3560 | 5.7 | −12.5 | 105 | 240 | 0/100 |
| 42 | 3430 | 5.5 | −11.4 | 108 | 180 | 0/100 |
| 43 | 3380 | 5.4 | −11.0 | 111 | 170 | 0/100 |
| 44 | 3520 | 5.6 | −12.2 | 121 | 220 | 0/100 |
| 45 | 3580 | 5.7 | −12.6 | 116 | 180 | 0/100 |

TABLE 6-continued

| | | | | | | 20 kV/mm |
|---|---|---|---|---|---|---|
| 46 | 3340 | 5.4 | −10.7 | 105 | 210 | 0/100 |
| 47 | 3430 | 5.5 | −11.4 | 119 | 190 | 0/100 |
| 48 | 3500 | 5.6 | −12.0 | 110 | 170 | 0/100 |
| 49 | 3390 | 5.5 | −11.1 | 111 | 190 | 0/100 |
| 50 | 3300 | 5.3 | −10.4 | 107 | 200 | 0/100 |
| 51 | 3620 | 5.8 | −12.9 | 110 | 200 | 0/100 |
| 52 | 3320 | 5.4 | −10.5 | 118 | 220 | 0/100 |

As is obvious from Tables 5 and 6, even if a combination of sintering additives with the Si component were used as in Examples 41 to 52, the relative dielectric constant εr was 3000 or more, the capacitance change $(\Delta C/C_{25})$max satisfied the X7R characteristic, the DC breakdown field strength was 100 kV/mm or more, the CR product was 140Ω·F or more, and the endurance time was 1000 hours or more when a voltage of 20 kV/mm was applied at 125° C. Thus, it was confirmed that highly reliable monolithic ceramic capacitors having a good dielectric characteristic, temperature characteristic, dielectric strength, and isolating property can be provided.

EXAMPLE 3

Next, monolithic ceramic capacitors according to Examples 61 to 70 were fabricated similar to [EXAMPLE 2] by the same method and process as those in Example 3 in [EXAMPLE 1], as a standard sample, except that predetermined impurities were added at predetermined molar amounts per 100 moles of the main component as shown in Table 7.

Table 7 shows the impurity components in Examples 61 to 70 and Example 3.

TABLE 7

| 3 | — | — | 0.35 |
|---|---|---|---|
| 61 | Zr/Ni/Fe | 0.53 (0.5/0.02/0.01) | 0.35 |
| 62 | Zr/Ni/Co/Al | 0.07 (0.04/0.01/0.01/0.01) | 0.35 |
| 63 | Zr/Ag/Mo | 0.08 (0.05/0.02/0.01) | 0.30 |
| 64 | Zr/Fe/Ta | 0.32 (0.3/0.01/0.01) | 0.40 |
| 65 | Zr/Pd/Zn | 0.08 (0.04/0.02/0.02) | 0.30 |
| 66 | Zr/Hf/Fe | 0.44 (0.4/0.02/0.02) | 0.35 |
| 67 | Ni/Nb | 0.32 (0.3/0.02) | 0.35 |
| 68 | Zr/W | 0.06 (0.05/0.01) | 0.35 |
| 69 | Ni/Cr/Mo | 0.52 (0.5/0.01/0.01) | 0.40 |
| 70 | Zr/Cu/Ag | 0.43 (0.4/0.02/0.01) | 0.35 |

As is obvious from Table 7, also, it was confirmed that the average grain sizes after sintering were advantageously 0.21 to 0.45 μm in Examples 61 to 70.

Then, the relative dielectric constant εr, dielectric loss tan δ, maximum capacitance change $(\Delta C/C_{25})$max, DC breakdown field strength, and CR product with respect to Examples 61 to 70, were measured and the high-temperature load test (20 kV/mm) was conducted, as in [EXAMPLE 1].

Table 8 shows the results, including with the results in Example 3.

TABLE 8

| | | | | | | 20 kV/mm |
|---|---|---|---|---|---|---|
| 3 | 3460 | 5.7 | −10.2 | 120 | 180 | 0/100 |
| 61 | 3530 | 5.4 | −12.0 | 105 | 160 | 0/100 |
| 62 | 3490 | 5.9 | −12.5 | 108 | 220 | 0/100 |
| 63 | 3430 | 5.3 | −10.5 | 111 | 210 | 0/100 |
| 64 | 3330 | 5.3 | −12.5 | 121 | 170 | 0/100 |
| 65 | 3660 | 5.9 | −11.1 | 116 | 160 | 0/100 |
| 66 | 3260 | 5.4 | −11.9 | 105 | 210 | 0/100 |
| 67 | 3340 | 5.4 | −12.0 | 119 | 200 | 0/100 |
| 68 | 3390 | 5.0 | −11.2 | 110 | 190 | 0/100 |
| 69 | 3340 | 5.3 | −11.0 | 111 | 180 | 0/100 |
| 70 | 3420 | 5.4 | −11.7 | 107 | 200 | 0/100 |

As is obvious from Tables 7 and 8, the relative dielectric constant εr was 3000 or more, the capacitance change $(\Delta C/C_{25})$max satisfied the X7R characteristic, the DC breakdown field strength was 100 kV/mm or more, the CR product was 140Ω·F or more, and the endurance time was 1000 hours or more even when a voltage of 20 kV/mm was applied at 125° C. even if the dielectric ceramic contained impurities. Thus, it was confirmed that highly reliable monolithic ceramic capacitors having good dielectric characteristic, temperature characteristic, dielectric strength, and isolating property can be provided.

EXAMPLE 4

Next, monolithic ceramic capacitors according to Examples 81 to 85 were fabricated similar to [EXAMPLE 2] by the same method and process as those in Example 3 in [EXAMPLE 1], as a standard sample, so as to be different only in thickness of the dielectric layer as shown in Table 9.

Then, the relative dielectric constant εr, dielectric loss tan δ, maximum capacitance change $(\Delta C/C_{25})$max, DC breakdown field strength, and CR product were measured and the high-temperature load test (20 kV/mm) was conducted, with respect to Examples 81 to 85, as in [EXAMPLE 1].

Table 9 shows the results including the results of Example 3.

TABLE 9

| | | | | | | | 20 kV/mm |
|---|---|---|---|---|---|---|---|
| 3 | 1 | 0.3 | 3460 | 5.7 | −10.2 | 120 | 180 | 0/100 |
| 81 | 2 | 0.3 | 3390 | 5.6 | −8.2 | 115 | 240 | 0/100 |
| 82 | 3 | 0.3 | 3290 | 5.4 | −5.3 | 109 | 350 | 0/100 |
| 83 | 5 | 0.3 | 3190 | 5.2 | −4.2 | 111 | 510 | 0/100 |
| 84 | 7 | 0.3 | 3100 | 5.1 | −3.1 | 105 | 720 | 0/100 |
| 85 | 12 | 0.3 | 3020 | 4.9 | −5.2 | 101 | 930 | 0/100 |

As is obvious from Table 9, when the thickness of the dielectric layer was 1 μm or more, the relative dielectric constant εr was 3000 or more, the capacitance change $(\Delta C/C_{25})$max satisfied the X7R characteristic, the DC breakdown field strength was 100 kV/mm or more, the CR product was 140Ω·F or more, and the endurance time was 1000 hours or more when a voltage of 20 kV/mm was applied. Thus, it was confirmed that monolithic ceramic capacitors superior in dielectric characteristic, temperature characteristic, dielectric strength, isolating property, and reliability can be provided.

The invention claimed is:

1. A dielectric ceramic comprising a composition represented by $100(Ba_{1-x-y}Sr_xCa_y)_m(Ti_{1-z}Zr_z)O_3+aBaO+bR_2O_3+cMgO+dMnO+eCuO+fV_2O_5+gX_uO_v$, in which R represents at least one element selected from the group consisting of La, Ce, Pr, Nd, Sm, Eu, Gd, Th, Dy, Ho, Er, Tm, Yb, Lu and Y; and X comprises Si, wherein $0 \leq x \leq 0.05$,
$0 \leq y \leq 0.08$,
$0 \leq z \leq 0.05$,
$0.990 \leq m$
$100.2 \leq (100m+a) \leq 102$;
$0.05 \leq b \leq 0.5$,
$0.05 \leq c \leq 2$,
$0.05 \leq d \leq 1.3$,
$0.1 \leq e \leq 1.0$,
$0.02 \leq f \leq 0.15$, and
$0.2 \leq g \leq 2$.

2. The dielectric ceramic according to claim 1, wherein y is $0.02 \leq y \leq 0.08$.

3. The dielectric ceramic according to claim 2, wherein the average grain size is 0.21 μm or more but not more than 0.45 μm.

4. The dielectric ceramic according to claim 3, wherein X comprises Si and at least one element selected from the group consisting of Li, B, Na, K, Be, Mg, Ca, Sr, Ba, Al, Ga, Ti and Zr.

5. The dielectric ceramic according to claim 4, wherein the dielectric ceramic contains at least one member_selected from the group consisting of Zr, Ni, Fe, Co, Al, Ag, Mo, Ta, Pd, Zn, Hf, Nb and W.

6. The dielectric ceramic according to claim 1, wherein the average grain size is 0.21 μm or more but not more than 0.45 μm.

7. The dielectric ceramic according to claim 6, wherein X comprises Si and at least one element selected from the group consisting of Li, B, Na, K, Be, Mg, Ca, Sr, Ba, Al, Ga, Ti and Zr.

8. The dielectric ceramic according to claim 7, wherein the dielectric ceramic contains at least one member_selected from the group consisting of Zr, Ni, Fe, Co, Al, Ag, Mo, Ta, Pd, Zn, Hf, Nb and W.

9. The dielectric ceramic according to claim 1, wherein X comprises Si and at least one element selected from the group consisting of Li, B, Na, K, Be, Mg, Ca, Sr, Ba, Al, Ga, Ti and Zr.

10. The dielectric ceramic according to claim 1, wherein the dielectric ceramic contains at least one member_selected from the group consisting of Zr, Ni, Fe, Co, Al, Ag, Mo, Ta, Pd, Zn, Hf, Nb and W.

11. The dielectric ceramic according to claim 1, wherein R is at least one of La, Ce and Pr.

12. A monolithic ceramic capacitor comprising a ceramic sintered compact formed from a ceramic laminated body composed of a stacked plurality of dielectric layers, a plurality of internal electrodes buried in the ceramic sintered compact in parallel to each other, and external electrodes disposed on outer surfaces of the ceramic sintered compact, wherein
the ceramic sintered compact is formed of a sintered dielectric ceramic according to claim 1.

13. The monolithic ceramic capacitor according to claim 12, wherein the internal electrodes comprise a base metal material.

14. The monolithic ceramic capacitor according to claim 13, wherein the external electrodes comprise a base metal material.

15. The monolithic ceramic capacitor according to claim 12, wherein the external electrodes comprise a base metal material.

16. A monolithic ceramic capacitor comprising a ceramic sintered compact formed from a ceramic laminated body composed of a stacked plurality of dielectric layers, a plurality of internal electrodes buried in the ceramic sintered compact in parallel to each other, and external electrodes disposed on outer surfaces of the ceramic sintered compact, wherein the ceramic sintered compact is formed of a sintered dielectric ceramic according to claim 2.

17. The monolithic ceramic capacitor according to claim 16, wherein the internal electrodes or the external electrodes or both comprise a base metal material.

18. A monolithic ceramic capacitor comprising a ceramic sintered compact formed from a ceramic laminated body composed of a stacked plurality of dielectric layers, a plurality of base metal containing internal electrodes buried in the ceramic sintered compact in parallel to each other, and base metal containing external electrodes disposed on outer surfaces of the ceramic sintered compact, wherein the ceramic sintered compact is formed of a sintered dielectric ceramic according to claim 5.

19. A monolithic ceramic capacitor comprising a ceramic sintered compact formed from a ceramic laminated body composed of a stacked plurality of dielectric layers, a plurality of internal electrodes buried in the ceramic sintered compact in parallel to each other, and external electrodes disposed on outer surfaces of the ceramic sintered compact, wherein the ceramic sintered compact is formed of a sintered dielectric ceramic according to claim 6.

20. The monolithic ceramic capacitor according to claim 19, wherein the internal electrodes or external electrodes or both comprise a base metal material.

* * * * *